June 2, 1964 F. L. DI NARDO 3,135,827

TELEVISION RECEIVER SOUND IMPROVEMENT APPARATUS

Filed Jan. 24, 1961 2 Sheets-Sheet 1

INVENTOR.
Frank L. DiNardo

BY Mueller & Aichele

Attys.

TELEVISION RECEIVER SOUND IMPROVEMENT APPARATUS

Filed Jan. 24, 1961 2 Sheets-Sheet 2

INVENTOR.
Frank L. DiNardo
BY Mueller & Aichele
Attys.

United States Patent Office 3,135,827 Patented June 2, 1964

3,135,827

TELEVISION RECEIVER SOUND IMPROVEMENT APPARATUS

Frank L. Di Nardo, Chicago, Ill., assignor to Motorola, Inc., Chicago, Ill., a corporation of Illinois Filed Jan. 24, 1961, Ser. No. 84,703
5 Claims. (Cl. 178—5.8)

Figure 1:
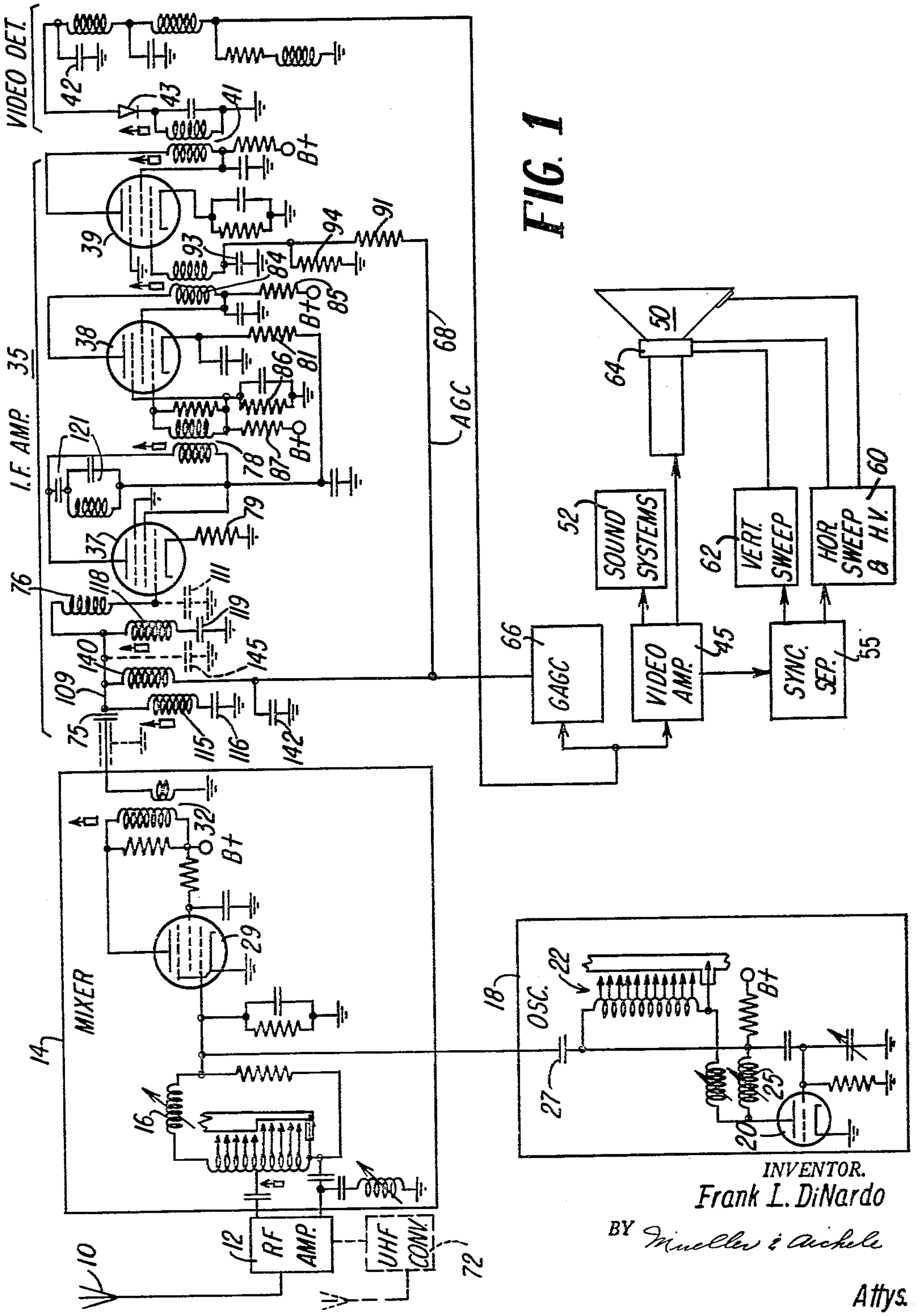

This invention relates to television receivers and more particularly to a trap and peaking network in the intermediate frequency section of a television receiver.

The present-day television signal comprises a video carrier with amplitude modulated information including horizontal and vertical synchronizing pulses and video or picture signal components. Accompanying sound information is transmitted on a frequency modulated carrier spaced by a fixed frequency, commonly 4.5 megacycles from the video carrier.

The composite television signal with this information occupies a relatively wide frequency range, generally 6 megacycles, and thus the receiver must accommodate a signal of such relatively wide bandwidth and also the receiver must maintain the sound and video signals well separated in order not to deteriorate the reproduced picture with sound components, or deteriorate the reproduced sound with spurious signals from the video signal components. Furthermore, the overall receiver bandwidth must be limited sufficiently to exclude adjacent channel signals in order that these do not enter the receiver and adversely affect the reproduction of the desired signal.

The approach has been to establish a relatively sharp receiver response band to encompass the video carrier and modulation components. The receiver is designed so that the sound carrier then falls along a relatively steep portion of the receiver response curve and it is customary to include a sound trap tuned to the frequency of the sound carrier to insure that this signal is 20–30 db below the level of the video carrier to minimize interference of the sound signal components with the picture.

It is also common to include a fine tuning device in the local oscillator of a superheterodyne television receiver to permit a slight variation or shift of the desired signal within the intermediate frequency pass band of the receiver to aid in optimizing receiver performance for a particular desired signal under the existing environmental conditions prevailing at the receiver. A receiver manufacturer usually contemplates that for best receiver operation and picture detail the receiver user will adjust the fine tuner so that the video carrier is somewhat down (for example 6 db), on the high frequency side of the receiver response curve and that the sound carrier is even farther down (for example 22 db) on the low frequency side of the response curve. However, this design relation of the television signal within the receiver response characteristic curve may not exist under some conditions. Thus, it is possible that the sound carrier may fall along a greatly attenuated portion of the receiver response curve so that the sound is weak or even lost completely even though a satisfactory picture is still being reproduced.

This condition can occur due to different causes. For example, a receiver which is properly adjusted initially may later be subject to frequency drift in the local oscillator thereof (especially during UHF operation) so that the produced intermediate frequency signal is lowered in frequency. The video carrier would then move to a lower frequency which may still give an acceptable, though perhaps smeary, picture. The sound carrier, however, would move to a greatly attenuated portion of the receiver response. That is, the sound carrier could be attenuated 60 db or more so that the sound may be undesirably attenuated or even lost entirely while the picture is still acceptable. This described condition can also prevail if the fine tuner of the receiver is misadjusted. That is, there can be an acceptable picture with a portion of the video signal components within the receiver pass band while at the same time the sound carrier and its modulation components are far enough removed from the maximum receiver response that satisfactory sound reproduction is not obtained.

An object of this invention is to overcome the above described problem in a simple and inexpensive manner.

Another object is to maintain satisfactory sound reproduction in a television receiver despite drift of the local oscillator signal frequency or misadjustment of the fine tuner of the television receiver.

A further object is to modify the frequency response characteristic of the television receiver for improving the consistency of reproduction of sound and picture signals thereby.

A feature of the invention is the provision of a television receiver having a frequency response characteristic with a given pass band for the modulated video carrier and adjacent thereto a "shelf," or generally uniform response range, within which the modulated sound carrier falls as the video carrier is varied within its pass band.

Another feature is the provision of an interconnected converter and intermediate frequency amplifier in a television receiver including trap circuits to establish a range of 41.25 megacycles to 47.25 megacycles for the video frequency carrier signal and a peaking circuit tuned to approximately 38.25 megacycles to establish improved sound carrier response in a frequency range adjacent the video carrier pass band range.

Another feature of the invention is the provision of a television receiver wherein improved sound signal response is obtained despite changes in the local oscillator signal frequency, and thus a shift of the intermediate frequency signal produced in the receiver, and wherein such improvement is obtained by means of an inductance coil parallel resonant with the distributed capacity of the interconnection of the converter and intermediate frequency amplifier of the receiver.

Figure 2:
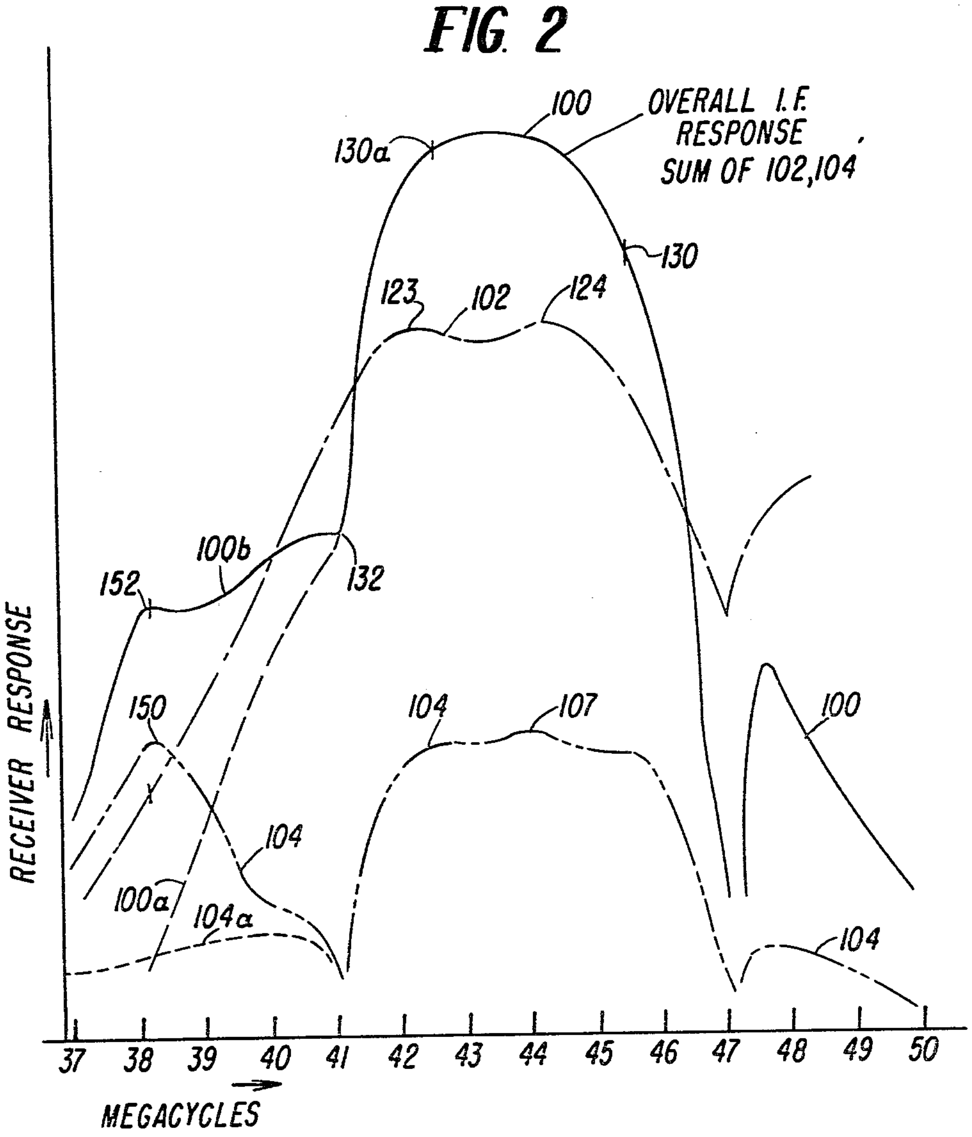

In the drawings:

FIG. 1 is a schematic diagram showing a television receiver incorporating the invention; and FIG. 2 is a graph showing the intermediate frequency response characteristics of portions of the receiver of FIG. 1.

In a specific form, the invention provides a relatively uniform sound subcarrier response in a television receiver as the modulated video carrier is shifted within the band pass range of the receiver, for example, by fine tuning. Attenuation traps tuned to 41.25 megacycles and 47.25 megacycles are connected between the mixer and first intermediate frequency amplifier of the receiver to establish a video carrier pass band of about 6 megacycles. This signal coupling circuit may also have some distributed capacity to a reference point or ground and an inductance coil is added between the circuit and the reference point to form a parallel resonant circuit with the distributed capacity at 38.25 megacycles. The overall receiver response will then include a "shelf" from 41.25 megacycles, where the sound carrier normally falls with proper tuning of the receiver, to a frequency of about 38.25 megacycles so that the sound signal can be properly detected and reproduced if it falls anywhere within this frequency range.

Considering now FIG. 1 and the general operation of the television receiver, the antenna 10 is connected to the radio frequency amplifier 12 which applies a received and selected signal to the mixer stage 14. The signal is applied to the tuning inductor 16 which is adjustable in steps in order to be tuned to the frequency of the various television signals or channels. A local oscillator 18 utilizing the triode vacuum tube 20 is tunable through adjustment of the inductor 22, the adjustment of which is ganged with the adjustment for the inductor 16. It is contemplated that the oscillator 18 will provide a signal which is spaced by a fixed frequency from the frequency of a desired signal in order to produce a signal of predetermined intermediate frequency. It is common in present-day television receivers to have the local oscillator produce a signal which will result in the conversion of a video carrier of an incoming signal to a frequency of 45.75 megacycles. Since the sound carrier of the common television signal is spaced 4.5 megacycles from the video carrier, this results in an intercarrier sound signal of 41.25 megacycles.

As is customary in superheterodyne television receivers of the type being described, a fine tuning adjustment 25 is provided. In the circuit shown this fine tuning adjustment takes the form of a small variable inductor which is connected across the tuned circuit of the local oscillator in order to permit a slight frequency variation of the local oscillator signal and thus a slight frequency variation of the video and sound carriers of intermediate frequency reproduced by the mixer 14. The output signal of the local oscillator 18 is coupled through capacitor 27 to the control grid of the pentode mixer tube 29. The desired signal, now of intermediate frequency, is derived from the mixer tube 29 through the transformer 32 having a tuned primary winding connected between the anode of tube 29 and a B+ energizing potential for this tube. The intermediate frequency signal available in transformer 32 is applied to the intermediate frequency amplifier 35 which includes amplifier tubes 37, 38 and 39. Further details of the circuit of amplifier 35 will be explained subsequently. The desired signal of intermediate frequency after passing through amplifier 35 is coupled by means of the transformer 41 to the video detector circuit 42 including the rectifier diode 43. Detector circuit 42 serves to demodulate the video carrier of intermediate frequency and this demodulated signal is applied to the video amplifier 45 and from amplifier 45 to the cathode ray picture tube 50 for reproduction of the modulation information as the television image. The sound carrier is also derived from the video detector 42 and applied to the video amplifier 45. After amplification therein the sound carrier is applied to the sound system 52 which provides further amplification and detection of the frequency modulation of this carrier. The sound system 52 may also include a suitable audio frequency amplifier and a loudspeaker for reproduction of this signal.

Video amplifier 45 is connected to the synchronizing signal separator 55 which separates the horizontal and vertical synchronizing pulses from the detected composite video signal in order to control the horizontal sweep system 60 and the vertical sweep system 62. The vertical sweep system 62 is connected to the deflection yoke 64 mounted on the cathode ray tube 50 and a suitable sawtooth signal is thereby applied to the yoke 64 in order to vertically scan the cathode ray beam of tube 50 and reproduce individual picture frames. The horizontal sweep system is connected to the yoke 64 and this system develops suitable sawtooth scanning signals for horizontal or line scanning of the cathode ray beam in tube 50 to produce the individual lines of the television picture in each frame. The system 60 may also include suitable circuitry to produce the high voltage potential of the order of 20 kv. for the screen or final anode of the tube 50.

The receiver further includes an AGC system 66 to which the video detector 42 applies a signal directly related to the strength of the received signal. The AGC system 66 may be gated by the horizontal sweep pulses developed in the horizontal sweep system 60 in accordance with known television practice. The system 66 therefore will produce a gain control potential on lead 68 which is applied to the intermediate frequency amplifier 35 to reduce the gain of this amplifier as the signal level increases. A similar automatic gain control potential is applied to the radio frequency amplifier 12 for reducing the gain of this stage with increased incoming signal strength.

The foregoing general description of the television receiver of FIG. 1 is intended to indicate the overall operation of the illustrated receiver, the detailed operation of which will be known and understood by those skilled in the art. Therefore, further elaboration on the operation of various circuits of the receiver is not believed necessary here. In order that the operation of the present invention may be understood, it is pointed out that the desired signal, converted to intermediate frequency, will be available in the transformer 32 at the output of the mixer stage 14. This signal will be of fixed frequency although this frequency can be varied somewhat by means of the fine tuning adjustment 25 in the oscillator 18 or might be varied under certain conditions through frequency drift of the oscillator 18 or in some cases by frequency drift of the local oscillator in the UHF converter 72 which could be coupled to the radio frequency amplifier 12. It will be understood that the UHF converter 72 would include a suitable mixer and local oscillator in order to convert a received signal to one within the range of the RF amplifier 12 which normally would tune only a VHF range. Regardless, however, of how the input or desired signal may be tuned, the precise frequency of the intermediate frequency signal available from mixer stage 14 will be subject to some variation by the fine tuning adjustment 25, or for some other reason.

Turning now to a detailed consideration of the intermediate frequency amplifier 35, the signals from mixer 14 are developed in the secondary winding of transformer 32, one terminal of which is grounded and the other terminal of which is coupled through a shielded cable and the blocking capacitor 75 and the inductor 76 to the control grid of amplifier tube 37. Shielded cable used for coupling this signal is desirable in a receiver of practical construction since the RF amplifier, mixer and oscillator circuits are generally located at a remote point from the remainder of the receiver and shielding is necessary in applying the intermediate signal to the amplifier 35. The signal applied to tube 37 is amplified and coupled through the transformer 78 to the grid of amplifier tube 38 for further amplification. It will be noted that the cathode of amplifier tube 37 is connected to ground through a bias resistor 79 and that the anode of tube 37 is direct current connected through the primary winding of transformer 78 and the cathode bias resistor 81 to the cathode of amplifier tube 38. The anode of tube 38 is direct current connected through the primary winding of transformer 84 and the decoupling resistor 85 to B+. Accordingly, tubes 37 and 38 are series connected for the direct current energization thereof. One side of the secondary winding of transformer 78 is coupled to the junction of resistors 86 and 87 which are connected between ground and B+ to form a voltage divider and bias the control grid of tube 38.

The intermediate frequency signal derived from amplifier tube 38 through the transformer 84 is applied to the control grid of the amplifier tube 39. One side of the secondary winding of transformer 84 is connected to the AGC lead 68 through the resistor 91 in order to control the gain of tube 39 by adjusting its grid bias. Capacitor 93 and resistor 94 are connected in parallel and coupled between the junction of resistor 91 with the secondary of transformer 84 and ground. The network 93, 94 is selected to form the detector circuit together with the grid and cathode electrodes of amplifier tube 39 in the event that the AGC system becomes locked out and the signal applied to the tube 39 rises above the bias for this tube. Such a system is described in more detail and claimed in the United States Patent No. 2,885,473 issued to Richard A. Kraft and assigned to the assignee of the present invention. The amplified intermediate frequency signal derived from the third stage of the amplifier 35 is coupled through the transformer 41 to the video detector 43 and from this detector to the other receiver stages as previously described.

Since the response of the television receiver should be maximized for the desired signal and minimized for signals on adjacent channels, the band pass characteristics of the intermediate frequency amplifier 35 must have a specifically designed shape for best receiver operation. In FIG. 2 there are curves showing the receiver response. Curve 100 represents the overall receiver response from the anode of mixer tube 29 through the video detector 42. Curve 102 represents the response from the control grid of the first IF amplifier tube 37 to the output of the video detector 42. Curve 104 represents the response of the receiver from the anode of the mixer tube 29 to the control grid of the first IF amplifier tube 37. Thus the curve 100 is intended to represent the sum of the curves 102 and 104.

In order to establish the response curves as shown in FIG. 2, the primary winding of transformer 32 in the output of the mixer 14 is tuned to 44 megacycles and is represented at point 107 of curve 104. The inductor 76 connected between the control grid of amplifier tube 37 and by way of lead 109 to the blocking capacitor 75, is made variable so that this inductor together with the grid to ground capacity for the circuit utilizing tube 37, this capacity being represented as capacitor 111, are series tuned to establish the width of the curve 104 on either side of point 107. This results in a relatively uniform response from 42 through 46 megacycles at the input to the tube 37.

A series resonant trap incorporating variable inductor 115 and capacitor 116 is connected between lead 109 and ground. This trap is tuned to 47.25 megacycles which produces the relatively sharp dip in curve 104 at this frequency. Similarly, a series resonant trap including variable inductor 118 and capacitor 119 is connected between lead 109 and ground to establish a sharply attenuated response at the frequency of 41.25 megacycles in curve 104.

In the anode circuit of the first IF amplifier tube 37 there is a series parallel resonant circuit 121 which is connected across the primary winding of transformer 78 and is tuned to 47.25 megacycles. The circuit 121 accounts for the very sharp dip at this frequency in the curve 102 and results in the effective discontinuity of the curve 100 at a frequency of 47.25 megacycles to establish the receiver response at the high frequency end of the pass range. The transformer 78 is tuned to a frequency of approximately 42 megacycles to establish the response at point 123 of curve 102 and the transformer 84 is tuned to a frequency between 44 and 45 megacycles to establish the point 124 of this curve. Transformer 41, between the final IF amplifier tube 39 and the video detector 42, is doubled tuned in a manner to further aid in establishing the curve 102 as shown in FIG. 2. Accordingly, through the stagger tuning of the IF coupling transformers and the tuning of the described traps, the overall response as represented by curve 100 is very high in the range of approximately 41–47 megacycles and is sharply attenuated on either side thereof.

As previously stated, the contemplated and ideal receiver operation would take place with the video carrier frequency being at 45.75 megacycles which is shown at point 130 on curve 100. Point 130 would preferably be approximately 6 db down from the maximun response of the curve 100. Since the video carrier is a vestigial sideband signal with the maximum picture information represented in a range on the low frequency side of 45.75 megacycles, the maximum picture information will be translated by the receiver and the reproduced television image will include the maximum detail with the video carrier positioned at point 130 since the high frequency portions of the modulated video carrier will then fall along the maximum response of the curve 100.

Under the above-described conditions with the video carrier tuned to point 130, which is accomplished by adjustment of the fine tuner 25 in the local oscillator 18. the sound carrier, spaced at 4.5 megacycles from the video carrier, will then fall at 41.25 megacycles which is at point 132 of curve 100. Point 132 represents considerable attenuation with respect to the maximum response to curve 100 and this may be of the order of 22 db down from the maximum response. With the sound carrier positioned at this point it is entirely practical to design the overall receiver including the sound system 52 to provide fully effective sound detection and reproduction. Furthermore, this places the sound signal at a point attenuated from the video signal in order to minimize interference of the sound signal with the video signal and possible reproduction of the sound signal on the television screen as a spurious image pattern.

As indicated initially however, the user of the television receiver might misadjust the fine tuner 25 such that the intermediate frequency of the video carrier is shifted to point 130*a* on curve 100. In this case a still acceptable picture image could be reproduced although since the high frequency portions of the modulated signal would be attenuated the picture image would not include maximum detail. Or, as also previously indicated, it is possible that for some other reason, such as local oscillator frequency drift, the video carrier would shift to a point such as point 130*a*. In this circumstance the sound carrier would also be shifted to a correspondingly lower frequency at 4.5 megacycles from the video carrier and the sound carrier could then fall along a portion of curve 100 represented in FIG. 2 as 100*a*. This might place the sound carrier at a level of 60 db or more below the maximum response to the video carrier and it may be found that the reproduced audio of the television receiver is greatly deteriorated or even rendered unusable under such conditions. In order to overcome this difficulty the present invention contemplates that a sound carrier "shelf" or region 100*b* of curve 100, will be provided to establish a more uniform response of the receiver despite a shift of the sound carrier to a frequency somewhat lower than 41.25 megacycles where it should be for optimum receiver performance.

To accomplish this purpose an inductance coil 140 is connected from lead 109 to ground through capacitor 142 which is a bypass for signal frequencies. Inductance coil 140 may be made variable if desired or may be initially manufactured as a fixed coil of sufficiently close tolerance to provide the desired result. Inductance coil 140 is made parallel resonant with the shunt capacity of lead 109 to ground, represented as capacitor 145, at a frequency of approximately 38.25 megacycles. It should be noted that capacitors 142 and 75 are relatively large so that the effective shunt capacity 145 will be determined largely by that of the shielded cable, or other wiring, and the shunt capacities of the inductors in the coupling network between the converter and the first intermediate frequency amplifier stage. Normally, since the effective value of capacitor 145 is quite large and the resultant shunt inductance appearing between lead 109 and ground is quite large, any resonance prevailing in the circuit would be at a very low frequency considerably removed from the region of 38 megacycles.

In FIG. 2 the curve 104*a* represents the frequency response of the coupling network between the mixer and IF amplifier in the absence of the coil 140. However, with this coil introduced and properly resonated to 38.25 megacycles to increase the response at this frequency, the curve 104 takes the shape illustrated in curve 104 with a peak occurring at point 150. This results in a corresponding maximizing response along the portion 100*b* of the overall response, that is, at point 152 which is at 38.25 megacycles. Curve portion 100*b* is actually composed of the resultant of the sloping portion of curve 104 between 38.25 megacycles and 41.25 megacycles and the oppositely sloping portion of curve 102 between these frequencies. Therefore it may be seen that by properly matching the slopes of these two curve portions a reasonably uniform sound carrier response may be obtained between the frequencies of 38.25 megacycles and 41.25 megacycles. As previously indicated the shape of curve 102 is determined by the tuned circuits in the second and third stages in the IF amplifier 35 and proper adjustment of these circuits in view of the response change introduced by the resonant peaking circuit including coil 140 will permit the establishing of this desired relationship. Accordingly, with the "shelf" 100*b* existing in the receiver response the video carrier may be shifted from 45.75 megacycles to beyond 42.75 megacycles, while the sound carrier correspondingly runs from 41.25 to 38.5 megacycles, and thus the sound carrier will fall along a portion of curve 100*b* where there is still substantial response in the receiver for good performance. For example, this response might be of the order of 30 to 40 db down from the maximum response of curve 100 and represents an entirely practical level for proper detection and reproduction of the sound signal.

In the illustrated form of the circuit shown in FIG. 1, AGC lead 68 is connected to the junction of inductor 140 and bypass capacitor 142 in order that the gain control potential can be applied through the inductor 140 and the inductor 76 to the control grid of tube 37. Customarily a resistor could be used to provide the necessary direct current coupling for the gain control potential. However, in the present circuit the resistor can be replaced with an inductor to permit the proper AGC connection and at the same time provide improved operation of the receiver by the modulated sound carrier signal throughout a practical range of frequency change of the video carrier intermediate frequency signal. Accordingly, the invention provides a simple and inexpensive means of insuring fully satisfactory sound reproduction despite the lack of proper adjustment of the television receiver local oscillator with respect to a desired signal.

I claim:

1. In a television receiver for utilizing a television signal having a modulated video carrier and a modulated sound carrier frequency spaced by a fixed amount, the combination of a frequency converter circuit with adjustable tuning means, an intermediate frequency amplifier for the frequency converted television signal with both of the carriers, first and second tuned trap circuits tuned to different frequencies to define a video pass band having given width to attenuate signals outside said pass band and including an attenuation point of the sound carrier, and resonant means tuned to a frequency spaced from said video pass band to establish increased response in a sound signal pass range adjacent said video pass band and outwardly from the attenuation point of the sound carrier, the tuning of said resonant means being sufficiently spaced in frequency from said video pass band that said sound signal pass range has a frequency range to include the sound carrier with the video carrier falling at various positions within said video pass band toward the attenuation point of the sound carrier.

2. In a television receiver for utilizing a television signal having a modulated video carrier and a modulated sound carrier frequency spaced by a fixed amount, the combination of a frequency converter circuit with adjustable tuning means, an intermediate frequency amplifier for the frequency converted television signal, first and second trap circuits tuned respectively to 41.25 megacycles and 47.25 megacycles to define a video pass band between said frequencies, and a tuned peaking circuit resonant at a frequency of the order of 38.25 megacycles to establish a sound signal pass range adjacent said video pass band with a response within the order of 40 db less than the response of said video pass band.

3. In a television receiver for utilizing a television signal having a modulated video carrier and a modulated sound carrier frequency spaced by fixed amount, the combination of a frequency converter circuit with adjustable tuning means including a local oscillator circuit providing a signal of variable frequency to produce an intermediate frequency signal in response to the television signal, an amplifier for the intermediate frequency signal, a coupling circuit connected between said frequency converter circuit and said amplifier, said coupling circuit and said amplifier including tuned means to establish a video pass band for the frequency converted video carrier, said coupling circuit having an effective capacitance with respect to a reference point, and an inductor coupled across said effective capacitance and having a value to be parallel resonant therewith at a frequency spaced from said video pass band and in which the frequency converted sound carrier falls with the frequency converted video carrier appearing within said video pass band.

4. In a television receiver for utilizing a television signal having a modulated video carrier and a modulated sound carrier frequency spaced by fixed amount, the combination of a frequency converter circuit with adjustable tuning means including a local oscillator circuit providing a signal of variable frequency to produce an intermediate frequency signal in response to the television signal, an amplifier for the intermediate frequency signal including an electron amplifier valve, a coupling circuit connected between said frequency converter circuit and said amplifier valve, said coupling circuit including tuned means to establish a video pass band for the frequency converted video carrier, said coupling circuit having an effective capacitance with respect to a reference point, and an inductor coupled across said effective capacitance and direct current connected to said amplifier valve, said inductor having a value to be parallel resonant with said capacitance at a frequency spaced from said video pass band and in which the frequency converted sound carrier falls with the frequency converted video carrier appearing within said video pass band, and circuit means providing a gain control potential related to the strength of a received television signal direct current coupled through said inductor to said electron valve for gain control thereof.

5. In a television receiver for utilizing a television signal having a modulated video carrier and a modulated sound carrier frequency spaced by a fixed amount, and which includes a frequency converter circuit with adjustable fine tuning means in a local oscillator thereof and an intermediate frequency amplifier coupled through a coupling circuit to the converter circuit for amplifying the frequency converted television signal, the combination of tuned circuit means in the intermediate frequency amplifier tuned to establish a video pass band within a given frequency range, and an inductance coil coupled in shunt with the intercoupling of the frequency con verter circuit and the intermediate frequency amplifier, said inductor having a value to be parallel resonant with the effective capacity of the coupling circuit at a frequency of the order of 3 megacycles outside said video pass band to establish a sound signal pass range within which the sound carrier appears as the video carrier is shifted by the fine tuning means within said video pass band.

References Cited in the file of this patent

UNITED STATES PATENTS

| | | |
|---|---|---|
| 2,619,536 | Cotsworth et al. | Nov. 25, 1952 |
| 2,901,537 | Comninos | Aug. 25, 1959 |
| 2,946,847 | Callender | July 26, 1960 |
| 3,025,343 | Waring | Mar. 13, 1962 |

FOREIGN PATENTS

| | | |
|---|---|---|
| 706,066 | Great Britain | Mar. 24, 1954 |